United States Patent
Shi

(10) Patent No.: US 11,115,956 B2
(45) Date of Patent: Sep. 7, 2021

(54) PAGING PROCESSING METHOD, USER EQUIPMENT, NETWORK DEVICE AND COMPUTER STORAGE MEDIUM

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/911,307

(22) Filed: Jun. 24, 2020

(65) Prior Publication Data
US 2020/0329456 A1   Oct. 15, 2020

Related U.S. Application Data

(63) Continuation of application No. PCT/CN2017/120270, filed on Dec. 29, 2017.

(51) Int. Cl.
| | | |
|---|---|---|
| *H04W 68/02* | (2009.01) | |
| *H04W 76/28* | (2018.01) | |
| *H04W 8/26* | (2009.01) | |

(52) U.S. Cl.
CPC .......... *H04W 68/02* (2013.01); *H04W 8/26* (2013.01); *H04W 76/28* (2018.02)

(58) Field of Classification Search
CPC .... H04W 68/02; H04W 76/28; H04W 68/025
See application file for complete search history.

(56) References Cited

U.S. PATENT DOCUMENTS

| | | | | |
|---|---|---|---|---|
| 2012/0044910 A1* | 2/2012 | Maeda | ................ | H04L 5/001 370/332 |
| 2014/0004850 A1* | 1/2014 | Kwon | ................ | H04W 68/02 455/423 |
| 2015/0173039 A1* | 6/2015 | Rune | ................ | H04W 52/0216 370/311 |
| 2015/0296385 A1* | 10/2015 | Zhang | ............ | H04W 72/1263 370/329 |
| 2016/0029434 A1* | 1/2016 | Qiu | ................ | H04W 52/0209 370/311 |
| 2016/0044578 A1 | 2/2016 | Vajapeyam et al. | | |

(Continued)

FOREIGN PATENT DOCUMENTS

| | | |
|---|---|---|
| CN | 101860961 A | 10/2010 |
| EP | 3178262 A1 | 6/2017 |

(Continued)

OTHER PUBLICATIONS

Written Opinion of the International Search Authority in the international application No. PCT/CN2017/120270, dated Jun. 27, 2018.
"3rd Generation Partnership Project; Technical Specification Group Radio Access Network; Evolved Universal Terrestrial Radio Access (E-UTRA); Radio Resource Control (RRC); Protocol specification (Release 11)" 3GPP TS 36.331 V11.8.0 (Jun. 2014), http://www.3gpp.org.

(Continued)

*Primary Examiner* — Dung Hong
(74) *Attorney, Agent, or Firm* — Perkins Coie LLP

(57) ABSTRACT

A method includes: adjusting a paging parameter and/or a paging calculation formula to obtain an adjusted paging parameter and/or paging calculation formula; and determining an adjusted Paging Frame (PF) and/or Paging Occasion (PO) based on the adjusted paging parameter and/or paging calculation formula.

19 Claims, 4 Drawing Sheets

---

101 — Adjust a paging parameter and/or a paging calculation formula to obtain an adjusted paging parameter and/or paging calculation formula 102 — Determine an adjusted PF and/or PO based on the adjusted paging parameter and/or paging calculation formula

(56) References Cited

U.S. PATENT DOCUMENTS

| | | | |
|---|---|---|---|
| 2016/0044605 A1 | 2/2016 | Vajapeyam et al. | |
| 2016/0057731 A1* | 2/2016 | Damnjanovic ... | H04W 72/0453 455/458 |
| 2018/0234917 A1* | 8/2018 | Kim .................. | H04W 52/0216 |
| 2019/0028999 A1 | 1/2019 | Yerramalli et al. | |
| 2020/0296687 A1 | 9/2020 | Zhu et al. | |
| 2020/0374960 A1* | 11/2020 | Deenoo ................ | H04W 72/14 |

FOREIGN PATENT DOCUMENTS

| | | |
|---|---|---|
| EP | 3659377 A2 | 6/2020 |
| EP | 3716702 A1 | 9/2020 |
| WO | 2012103778 A1 | 8/2012 |
| WO | 2016022651 A1 | 2/2016 |
| WO | 2019023254 A2 | 1/2019 |

OTHER PUBLICATIONS

Supplementary European Search Report in the European application No. 17936656.2, dated Nov. 30, 2020.
Intel Corporation. "NR Paging Design" R1-1717356, 3GPP TSG RAN WG1 Meeting #90bis, Oct. 13, 2017 (Oct. 13, 2017), sections 1-3.
Huawei et al. "Finalization of NR Paging" R1-1719373, 3GPP TSG RAN WG1 Meeting #91, Dec. 1, 2017 (Dec. 1, 2017), sections 1-3.
CMCC. "Discussion on Paging Occasion Design for NR" R1-1720583, 3GPP TSG RAN WG1 Meeting 91, Dec. 1, 2017 (Dec. 1, 2017), sections 1 and 2.
International Search Report in the international application No. PCT/CN2017/120270, dated Jun. 27, 2018.

\* cited by examiner

PAGING PROCESSING METHOD, USER EQUIPMENT, NETWORK DEVICE AND COMPUTER STORAGE MEDIUM

CROSS-REFERENCE TO RELATED APPLICATIONS

The present disclosure is a U.S. continuation application of International Application No. PCT/CN2017/120270, filed on Dec. 29, 2017. The contents of the application are incorporated herein by reference in its entirety.

BACKGROUND

Paging is an important mechanism for Long Term Evolution (LTE) and $5^{th}$-Generation (5G). The location management of terminals can be implemented. The initiation of Mobile Terminated (MT) services can be facilitated. A power saving function in an idle mode can be achieved. By means of LTE and 5G technologies, paging may be performed in a licensed frequency band or a licensed-secondary unlicensed access network based on a Primary Cell (PCell) of the licensed frequency band. An unlicensed Secondary Cell (SCell) does not transmit a paging message.

SUMMARY

The disclosure relates to the technical field of information processing, and more particularly, to a paging processing method, a User Equipment (UE), a network device and a computer storage medium.

An embodiment of the disclosure provides a paging processing method, applicable to a UE. The method may include:

adjusting at least one of a paging parameter or a paging calculation formula to obtain at least one of the adjusted paging parameter or the adjusted paging calculation formula; and determining at least one of an adjusted Paging Frame (PF) or an adjusted Paging Occasion (PO) based on at least one of the adjusted paging parameter or the adjusted paging calculation formula.

An embodiment of the disclosure provides a paging processing method, applicable to a network device. The method may include:

adjusting at least one of a paging parameter or a paging calculation formula to obtain at least one of the adjusted paging parameter or the adjusted paging calculation formula; and determining at least one of an adjusted PF or an adjusted PO based on at least one of the adjusted paging parameter or the adjusted paging calculation formula, and sending paging based on at least one of the adjusted PF or the adjusted PO.

An embodiment of the disclosure provides a UE. The UE may include:

a first processing unit, configured to adjust at least one of a paging parameter or a paging calculation formula to obtain at least one of the adjusted paging parameter or the adjusted paging calculation formula, and determine at least one of an adjusted PF or an adjusted PO based on at least one of the adjusted paging parameter or paging calculation formula.

DETAILED DESCRIPTION

The existing technology does not support the transmission of the paging message on an unlicensed PCell. In a New Radio (NR) system, a paging mechanism has not been fully defined. Moreover, in the existing technology, no specific definition is given as to how to ensure the transmission reliability of the paging message.

In order to solve the foregoing technical problems, embodiments of the disclosure provide a paging processing method, a UE, a network device and a computer storage medium.

In order to understand the features and technical contents of the embodiments of the disclosure in more detail, the implementation of the embodiments of the disclosure will be described in detail below with reference to the accompanying drawings. The accompanying drawings are for reference only and are not intended to limit the embodiments of the disclosure.

First Embodiment

Figure 1:
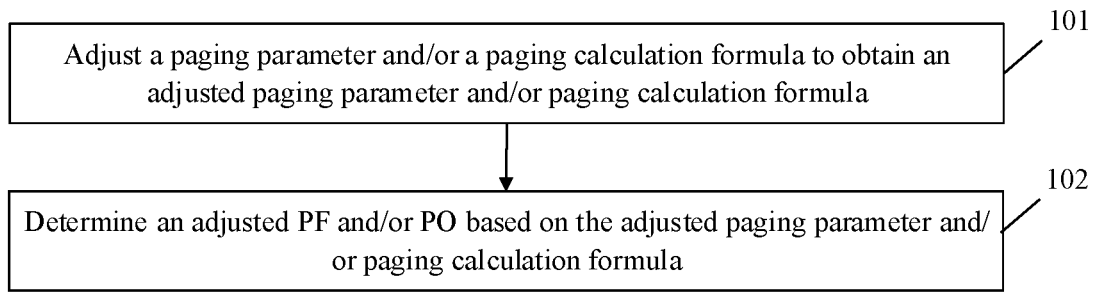
FIG. 1 shows a flowchart of a paging processing method according to embodiments of the disclosure.

The embodiment of the disclosure provides a paging processing method, applicable to a UE. As shown in FIG. 1, the method includes the following operations.

In operation 101, a paging parameter and/or a paging calculation formula are/is adjusted to obtain an adjusted paging parameter and/or paging calculation formula.

In operation 102, an adjusted PF and/or PO are/is determined based on the adjusted paging parameter and/or paging calculation formula.

In order to improve a paging success rate in an unlicensed network, the solution provided in the present embodiment may comprise performing paging enhancement from a network side and a terminal side respectively. There may be a processing manner in the present embodiment. That is, the network device (such as a base station) and the UE side may execute the same adjustment strategy respectively, and activate an adjustment operation simultaneously for respective adjustments. Then, due to adjustments on both sides, the two parties may send and receive paging by using the adjusted PF and PO.

In addition, paging adjustment may also be triggered by the network side (such as a base station). The triggering scenario may be as follows. When a network device (such as a base station) of the network side finds an enhanced paging requirement or a low paging response due to a Listen Before Talk (LBT) failure, it can be determined that an enhanced paging mode needs to be entered, and then the number of PFs and/or the number of POs in a PF may be increased by modifying the paging calculation formula or modifying the paging parameter.

That is, before operation 101, the method may further include the following operations.

An indication for an unlicensed paging enhancement mode from a network side is received.

It is determined to adjust the paging parameter and/or the paging calculation formula based on the indication for the unlicensed paging enhancement mode.

The present embodiment is described with reference to a process of performing paging enhancement on a UE side.

The base station indicates an unlicensed paging enhancement mode in system information. After receiving the indication, the UE enters a paging enhancement mode.

It should also be noted that when there is a paging enhancement mode provided in a system, the UE may be directly notified through a certain preset indication that the paging enhancement mode is needed. When there are two or more paging enhancement modes provided in the system, the UE may be instructed to enter which paging enhancement mode while entering a paging enhancement mode. For example, there are paging enhancement modes 1, 2, 3 and 4 currently. When being instructed to enter an unlicensed paging enhancement mode, the UE may be instructed to enter, for example, paging enhancement mode 2 at the same time. It should also be understood that each paging enhancement mode may correspond to a set of adjustment manners for a paging parameter and for a paging calculation formula. The adjustment manners, for a paging parameter and a paging calculation formula, corresponding to different paging enhancement modes may be the same or different, or may be partially the same.

An enhanced paging mode in the present embodiment is implemented by a method of changing a paging parameter or a PF and PO calculation formula. The specific adjustment method may include at least one of the following: reducing a paging cycle; adjusting a parameter in the paging calculation formula; performing arithmetic operation on at least one calculation parameter in the paging calculation formula with a numeral value to obtain an adjusted paging calculation formula; and increasing a PO in a PF.

The foregoing adjustment manners may be specifically described below respectively.

In the first manner, a paging cycle is reduced. That is, a T value is reduced.

This method may be directly implemented by modifying system information without conjunction with the indication for the paging enhancement mode. Therefore, this method may make the UE not aware of entering the enhanced paging mode. However, the base station cannot directly modify the T value, because the modification of the T value needs to be notified to a core network element such as an Core Access and Mobility Management Function (AMF) or an Mobility Management Entity (MME).

In the second manner, a parameter in the paging calculation formula is adjusted.

Specifically, the operation that a parameter in the paging calculation formula is adjusted includes the following operation.

A variable N in the paging calculation formula is reconfigured such that a value of the reconfigured variable N is greater than a value of the non-reconfigured variable N. That is, a parameter for calculating the PF is modified. The formula is still performed according to SFN mod T=(T div N)*(UE_ID mod N). When an N value is being configured, if the enhanced paging mode is entered and the N value is not greater than T, the N value may be increased, may be, for example, doubled, and may be, of course, multiplied. No exhaustion is performed here.

In the third manner, arithmetic operation is performed on at least one calculation parameter in the paging calculation formula with a numeral value to obtain an adjusted paging calculation formula. What needs to be explained here is that the processing manner is mainly capable of reducing the T value in the paging calculation formula or increasing the N value. Specifically, the manner of reducing the T value may be: subtracting T from or dividing T by a certain value (such as A); and/or, adding the N value to or multiplying the N value by certain data (such as B).

For example, SFN mod=(T div 2*N)*(UE_ID mod 2*N). That is, the N value is directly multiplied by 2 in the formula. Here, 2 is an example and may be changed to another value.

In the fourth manner, a PO in a PF is increased.

That is, the number of POs in each PF is increased.

In this way, the number of POs may be increased by modifying a subframe pattern. Currently in LTE, the maximum number of POs in a PF is 4. In an NR unlicensed frequency band, if it is needed to enter the enhanced paging mode, other POs may be added. For example, the number of POs in a PF is increased to 5, 6 or more.

It can be seen that by adopting the above solution, after an indication for an unlicensed paging enhancement mode is received, a PF and/or a PO can be re-determined through an adjusted paging parameter and paging calculation formula. As a result, the number of paging times is increased to ensure that the paging reliability on an unlicensed frequency band can be improved.

Second Embodiment

The embodiment of the disclosure provides a paging processing method, applicable to a network device. The method includes the following operations.

A paging parameter and/or a paging calculation formula are/is adjusted to obtain an adjusted paging parameter and/or paging calculation formula.

An adjusted PF and/or PO are/is determined based on the adjusted paging parameter and/or paging calculation formula, and paging is sent based on the adjusted PF and/or PO.

That is, there may be a processing manner in the present embodiment. That is, the network device (such as a base station) and the UE side may execute the same adjustment strategy respectively, and activate an adjustment operation simultaneously for respective adjustments. Then, due to adjustments on both sides, the two parties may send and receive paging by using the adjusted PF and PO.

In addition, the method may further include the following operation. An indication for an unlicensed paging enhancement mode is sent to a UE, and the UE is notified to adjust the paging parameter or the paging calculation formula through the indication.

In order to improve a paging success rate in an unlicensed network, the solution provided in the present embodiment may comprise performing paging enhancement from a network side and a terminal side respectively.

The triggering scenario may be as follows. When a network device (such as a base station) of the network side finds an enhanced paging requirement or a low paging response due to an LBT failure, it can be determined that an enhanced paging mode needs to be entered, and then the number of PFs and/or the number of POs in a PF may be increased by modifying the paging calculation formula or modifying the paging parameter.

The present embodiment is described with reference to a process of performing paging enhancement on a UE side.

The base station indicates an unlicensed paging enhancement mode in system information. After receiving the indication, the UE enters a paging enhancement mode.

It should also be noted that when there is a paging enhancement mode provided in a system, the UE may be directly notified through a certain preset indication that the paging enhancement mode is needed. When there are two or more paging enhancement modes provided in the system, the UE may be instructed to enter which paging enhancement mode while entering a paging enhancement mode. For example, there are paging enhancement modes 1, 2, 3 and 4 currently. When being instructed to enter an unlicensed paging enhancement mode, the UE may be instructed to enter, for example, paging enhancement mode 2 at the same time. It should also be understood that each paging enhancement mode may correspond to a set of adjustment manners for a paging parameter and for a paging calculation formula. The adjustment manners, for a paging parameter and a paging calculation formula, corresponding to different paging enhancement modes may be the same or different, or may be partially the same.

An enhanced paging mode in the present embodiment is implemented by a method of changing a paging parameter or a PF and PO calculation formula. The specific adjustment method may include at least one of the following: reducing a paging cycle; adjusting a parameter in the paging calculation formula; performing arithmetic operation on at least one calculation parameter in the paging calculation formula with a numeral value to obtain an adjusted paging calculation formula; and increasing a PO in a PF.

The foregoing adjustment manners may be specifically described below respectively.

In the first manner, a paging cycle is reduced. That is, a T value is reduced.

This method may be directly implemented by modifying system information without conjunction with the indication for the paging enhancement mode. Therefore, this method may make the UE not aware of entering the enhanced paging mode. However, the base station cannot directly modify the T value, but needs to notify a core network side to perform the process of reducing a paging cycle. For example, a core network element such as an AMF or an MME may be notified.

In the second manner, a parameter in the paging calculation formula is adjusted.

Specifically, the operation that a parameter in the paging calculation formula is adjusted includes the following operation.

A variable N in the paging calculation formula is reconfigured such that a value of the reconfigured variable N is greater than a value of the non-reconfigured variable N. That is, a parameter for calculating the PF is modified. The formula is still performed according to SFN mod T=(T div N)*(UE_ID mod N). When an N value is being configured, if the enhanced paging mode is entered and the N value is not greater than T, the N value may be increased, may be, for example, doubled, and may be, of course, multiplied. No exhaustion is performed here.

In the third manner, at least one calculation parameter in the paging calculation formula and a value are calculated to obtain an adjusted paging calculation formula. What needs to be explained here is that the processing manner is mainly capable of reducing the T value in the paging calculation formula or increasing the N value. Specifically, the manner of reducing the T value may be: subtracting T from or dividing T by a certain value (such as A); and/or, adding the N value to or multiplying the N value by certain data (such as B).

For example, SFN mod T=(T div 2*N)*(UE_ID mod 2*N). That is, the N value is directly multiplied by 2 in the formula. Here, 2 is an example and may be changed to another value.

In the fourth manner, a PO in a PF is increased.

That is, the number of POs in each PF is increased.

In this way, the number of POs may be increased by modifying a subframe pattern. Currently in LTE, the maximum number of POs in a PF is 4. In an NR unlicensed frequency band, if it is needed to enter the enhanced paging mode, other POs may be added. For example, the number of POs in a PF is increased to 5, 6 or more.

It can be seen that by adopting the above solution, after an indication for an unlicensed paging enhancement mode is received, a PF and/or a PO can be re-determined through an adjusted paging parameter and paging calculation formula. As a result, the number of paging times is increased to ensure that the paging reliability on an unlicensed frequency band can be improved.

Third Embodiment

Figure 2:
FIG. 2 shows a schematic composition structure diagram of a UE according to embodiments of the disclosure.

The embodiment of the disclosure provides a UE. As shown in FIG. 2, the UE includes a first processing unit 22.

The first processing unit 22 is configured to adjust a paging parameter and/or a paging calculation formula to obtain an adjusted paging parameter and/or paging calculation formula, and determine an adjusted PF and/or PO based on the adjusted paging parameter and/or paging calculation formula.

In order to improve a paging success rate in an unlicensed network, the solution provided in the present embodiment may comprise performing paging enhancement from a network side and a terminal side respectively.

There may be a processing manner in the present embodiment. That is, the network device (such as a base station) and the UE side may execute the same adjustment strategy respectively, and activate an adjustment operation simultaneously for respective adjustments. Then, due to adjustments on both sides, the two parties may send and receive paging by using the adjusted PF and PO.

The triggering scenario may be as follows. When a network device (such as a base station) of the network side finds an enhanced paging requirement or a low paging response due to an LBT failure, it can be determined that an enhanced paging mode needs to be entered, and then the number of PFs and/or the number of POs in a PF may be increased by modifying the paging calculation formula or modifying the paging parameter. That is, the UE further includes a first communication unit 21, which is configured to receive an indication for an unlicensed paging enhancement mode from a network side.

Accordingly, the first processing unit 22 determines to adjust the paging parameter and/or the paging calculation formula based on the indication for the unlicensed paging enhancement mode.

The present embodiment is described with reference to a process of performing paging enhancement on a UE side.

The base station indicates an unlicensed paging enhancement mode in system information. After receiving the indication, the UE enters a paging enhancement mode.

It should also be noted that when there is a paging enhancement mode provided in a system, the UE may be directly notified through a certain preset indication that the paging enhancement mode is needed. When there are two or more paging enhancement modes provided in the system, the UE may be instructed to enter which paging enhancement mode while entering a paging enhancement mode. For example, there are paging enhancement modes 1, 2, 3 and 4 currently. When being instructed to enter an unlicensed paging enhancement mode, the UE may be instructed to enter, for example, paging enhancement mode 2 at the same time. It should also be understood that each paging enhancement mode may correspond to a set of adjustment manners for a paging parameter and for a paging calculation formula. The adjustment manners, for a paging parameter and a paging calculation formula, corresponding to different paging enhancement modes may be the same or different, or may be partially the same.

An enhanced paging mode in the present embodiment is implemented by a method of changing a paging parameter or a PF and PO calculation formula. The specific adjustment method may include at least one of the following: reducing a paging cycle; adjusting a parameter in the paging calculation formula; performing arithmetic operation on at least one calculation parameter in the paging calculation formula with a numeral value to obtain an adjusted paging calculation formula; and increasing a PO in a PF.

The foregoing adjustment manners may be specifically described below respectively.

In the first manner, the first processing unit 22 reduces a paging cycle. That is, a T value is reduced.

This method may be directly implemented by modifying system information without conjunction with the indication for the paging enhancement mode. Therefore, this method may make the UE not aware of entering the enhanced paging mode. However, the base station cannot directly modify the T value, because the modification of the T value needs to be notified to a core network element such as an AMF or an MME.

In the second manner, the first processing unit 22 adjusts a parameter in the paging calculation formula.

Specifically, the operation that a parameter in the paging calculation formula is adjusted includes the following operation.

A variable N in the paging calculation formula is reconfigured such that a value of the reconfigured variable N is greater than a value of the non-reconfigured variable N. That is, a parameter for calculating the PF is modified. The formula is still performed according to SFN mod T=(T div N)*(UE_ID mod N). When an N value is being configured, if the enhanced paging mode is entered and the N value is not greater than T, the N value may be increased, may be, for example, doubled, and may be, of course, multiplied. No exhaustion is performed here.

In the third manner, the first processing unit 22 calculates at least one calculation parameter in the paging calculation formula and a value to obtain an adjusted paging calculation formula. What needs to be explained here is that the processing manner is mainly capable of reducing the T value in the paging calculation formula or increasing the N value. Specifically, the manner of reducing the T value may be: subtracting T from or dividing T by a certain value (such as A); and/or, adding the N value to or multiplying the N value by certain data (such as B).

For example, SFN mod T=(T div 2*N)*(UE_ID mod 2*N). That is, the N value is directly multiplied by 2 in the formula. Here, 2 is an example and may be changed to another value.

In the fourth manner, a PO in a PF is increased.

That is, the number of POs in each PF is increased.

In this way, the number of POs may be increased by modifying a subframe pattern. Currently in LTE, the maximum number of POs in a PF is 4. In an NR unlicensed frequency band, if it is needed to enter the enhanced paging mode, other POs may be added. For example, the number of POs in a PF is increased to 5, 6 or more.

It can be seen that by adopting the above solution, after an indication for an unlicensed paging enhancement mode is received, a PF and/or a PO can be re-determined through an adjusted paging parameter and paging calculation formula. As a result, the number of paging times is increased to ensure that the paging reliability on an unlicensed frequency band can be improved.

Fourth Embodiment

Figure 3:
FIG. 3 shows a schematic composition structure diagram of a network device according to embodiments of the disclosure.

The embodiment of the disclosure provides a network device. As shown in FIG. 3, the network device includes a second processing unit 32 and a second communication unit 31.

The second processing unit 32 is configured to adjust a paging parameter and/or a paging calculation formula to obtain an adjusted paging parameter and/or paging calculation formula, and determine an adjusted PF and/or PO based on the adjusted paging parameter and/or paging calculation formula.

The second communication unit 31 is configured to send paging based on the adjusted PF and/or PO.

In order to improve a paging success rate in an unlicensed network, the solution provided in the present embodiment may perform paging enhancement from a network side and a terminal side respectively.

There may be a processing manner in the present embodiment. That is, the network device (such as a base station) and the UE side may execute the same adjustment strategy respectively, and activate an adjustment operation simultaneously for respective adjustments. Then, due to adjustments on both sides, the two parties may send and receive paging by using the adjusted PF and PO.

In addition, a UE may be triggered by the network side to perform paging enhancement processing. The triggering scenario may be as follows. When a network device (such as a base station) of the network side finds an enhanced paging requirement or a low paging response due to an LBT failure, it can be determined that an enhanced paging mode needs to be entered, and then the number of PFs and/or the number of POs in a PF may be increased by modifying the paging calculation formula or modifying the paging parameter. That is, the second communication unit 31 sends an indication for an unlicensed paging enhancement mode to a UE, and notifies the UE to adjust the paging parameter or the paging calculation formula through the indication.

The present embodiment is described with reference to a process of performing paging enhancement on a UE side.

The base station indicates an unlicensed paging enhancement mode in system information. After receiving the indication, the UE enters a paging enhancement mode.

It should also be noted that when there is a paging enhancement mode provided in a system, the UE may be directly notified through a certain preset indication that the paging enhancement mode is needed. When there are two or more paging enhancement modes provided in the system, the UE may be instructed to enter which paging enhancement mode while entering a paging enhancement mode. For example, there are paging enhancement modes 1, 2, 3 and 4 currently. When being instructed to enter an unlicensed paging enhancement mode, the UE may be instructed to enter, for example, paging enhancement mode 2 at the same time. It should also be understood that each paging enhancement mode may correspond to a set of adjustment manners for a paging parameter and for a paging calculation formula. The adjustment manners, for a paging parameter and a paging calculation formula, corresponding to different paging enhancement modes may be the same or different, or may be partially the same.

An enhanced paging mode in the present embodiment is implemented by a method of changing a paging parameter or a PF and PO calculation formula. The specific adjustment method may include at least one of the following: reducing a paging cycle; adjusting a parameter in the paging calculation formula; performing arithmetic operation on at least one calculation parameter in the paging calculation formula with a numeral value to obtain an adjusted paging calculation formula; and increasing a PO in a PF.

The foregoing adjustment manners may be specifically described below respectively.

In the first manner, the network device further includes a second processing unit 32.

The second processing unit 32 reduces a paging cycle. That is, a T value is reduced.

This method may be directly implemented by modifying system information without conjunction with the indication for the paging enhancement mode. Therefore, this method may make the UE not aware of entering the enhanced paging mode. However, the base station cannot directly modify the T value, but needs to notify a core network side to perform the process of reducing a paging cycle. For example, a core network element such as an AMF or an MME may be notified.

In the second manner, the second processing unit 32 adjusts a parameter in the paging calculation formula.

Specifically, the operation that a parameter in the paging calculation formula is adjusted includes the following operation.

A variable N in the paging calculation formula is reconfigured such that a value of the reconfigured variable N is greater than a value of the non-reconfigured variable N. That is, a parameter for calculating the PF is modified. The formula is still performed according to SFN mod T=(T div N)*(UE_ID mod N). When an N value is being configured, if the enhanced paging mode is entered and the N value is not greater than T, the N value may be increased, may be, for example, doubled, and may be, of course, multiplied. No exhaustion is performed here.

In the third manner, the second processing unit 32 performs arithmetic operation on at least one calculation parameter in the paging calculation formula with a numeral value to obtain an adjusted paging calculation formula. What needs to be explained here is that the processing manner is mainly capable of reducing the T value in the paging calculation formula or increasing the N value. Specifically, the manner of reducing the T value may be: subtracting T from or dividing T by a certain value (such as A); and/or, adding the N value to or multiplying the N value by certain data (such as B).

For example, SFN mod T=(T div 2*N)*(UE_ID mod 2*N). That is, the N value is directly multiplied by 2 in the formula. Here, 2 is an example and may be changed to another value.

In the fourth manner, a PO in a PF is increased.

That is, the number of POs in each PF is increased.

In this way, the number of POs may be increased by modifying a subframe pattern. Currently in LTE, the maximum number of POs in a PF is 4. In an NR unlicensed frequency band, if it is needed to enter the enhanced paging mode, other POs may be added. For example, the number of POs in a PF is increased to 5, 6 or more.

It can be seen that by adopting the above solution, after an indication for an unlicensed paging enhancement mode is received, a PF and/or a PO can be re-determined through an adjusted paging parameter and paging calculation formula. As a result, the number of paging times is increased to ensure that the paging reliability on an unlicensed frequency band can be improved.

Figure 4:
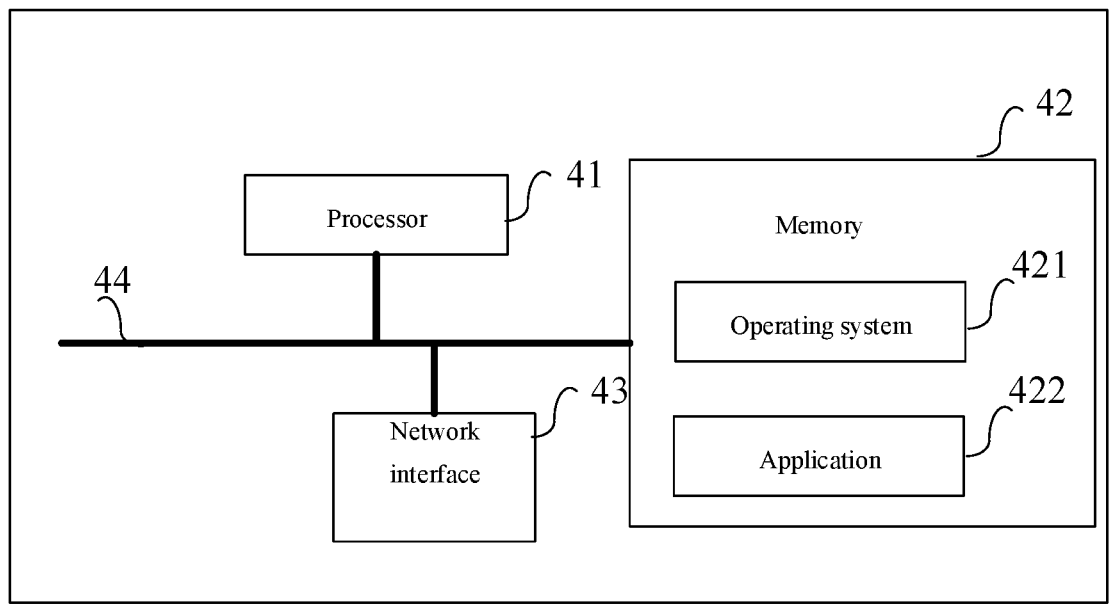
FIG. 4 shows a schematic hardware structure diagram according to embodiments of the disclosure.

An embodiment of the disclosure further provides a hardware component structure of a UE or a network device. As shown in FIG. 4, the structure includes at least one processor 41, a memory 42, and at least one network interface 43. The various components are coupled together via a bus system 44. It can be understood that the bus system 44 is configured to implement connection communication between the components. The bus system 44 includes a power bus, a control bus, and a status signal bus in addition to a data bus. However, for the sake of clarity, the various buses are marked as the bus system 44 in FIG. 4.

It can be understood that the memory 42 in the embodiment of the disclosure may be a volatile memory or a nonvolatile memory, or may include both volatile and nonvolatile memories.

In some implementation manners, the memory 42 stores the following elements, executable modules or data structures, or their subsets, or their extended sets:

an operating system 421 and an application 422.

The processor 41 is configured to process the operations of the method in the foregoing first or second embodiment. The descriptions are omitted herein.

Embodiments of the disclosure provide a computer storage medium. The computer storage medium stores computer-executable instructions, when the computer-executable instructions are executed, the operations of the method in the foregoing first or second embodiment are performed.

If the foregoing apparatus according to the embodiments of the disclosure is implemented in the form of a software functional module and sold or used as an independent product, the apparatus may also be stored in a computer-readable storage medium. Based on such an understanding, essential parts of the technical solutions of the embodiments of the disclosure or parts that contribute to the existing technology may be embodied in the form of a software product. The computer software product is stored in a storage medium, and includes a plurality of instructions for causing a computer device (which may be a personal computer, a server, or a network device, etc.) to perform all or part of the methods described in each embodiment of the disclosure. The foregoing storage medium includes: a U disk, a mobile hard disk, a Read Only Memory (ROM), a magnetic disk or an optical disk, and other media capable of storing program codes. In this way, the embodiments of the disclosure are not limited to any specific combination of hardware and software.

Accordingly, embodiments of the disclosure further provide a computer storage medium having computer programs stored therein. The computer programs are configured to perform a data scheduling method according to embodiments of the disclosure.

Although the preferred embodiments of the disclosure have been disclosed for illustrative purposes, those skilled in the art will recognize that various modifications, additions, and substitutions are also possible, and therefore, the scope of the disclosure should not be limited to the foregoing embodiments.

The invention claimed is:

1. A paging processing method, applicable to a User Equipment (UE), the method comprising:
adjusting at least one of a paging parameter or a paging calculation formula to obtain at least one of the adjusted paging parameter or the adjusted paging calculation formula; and determining at least one of an adjusted Paging Frame (PF) or an adjusted Paging Occasion (PO) based on at least one of the adjusted paging parameter or the adjusted paging calculation formula;

receiving an indication for an unlicensed paging enhancement mode from a network side; and determining to adjust at least one of the paging parameter or the paging calculation formula based on the indication for the unlicensed paging enhancement mode.

2. The method according to claim 1, wherein the adjusting at least one of a paging parameter or a paging calculation formula comprises:

reducing a paging cycle.

3. The method according to claim 1, wherein the adjusting at least one of a paging parameter or a paging calculation formula comprises:

adjusting a parameter in the paging calculation formula.

4. The method according to claim 3, wherein the adjusting a parameter in the paging calculation formula comprises:

reconfiguring a variable N in the paging calculation formula such that a value of the reconfigured variable N is greater than a value of the non-reconfigured variable N.

5. The method according to claim 1, wherein the adjusting at least one of a paging parameter or a paging calculation formula comprises:

performing arithmetic operation on at least one calculation parameter in the paging calculation formula with a numeral value to obtain the adjusted paging calculation formula.

6. The method according to claim 1, wherein the adjusting at least one of a paging parameter or a paging calculation formula comprises:

increasing a PO in a PF.

7. The method according to claim 1, wherein the indication is used for notifying the UE to adjust the paging parameter or the paging calculation formula.

8. A paging processing method, applicable to a network device, the method comprising:

adjusting at least one of a paging parameter or a paging calculation formula to obtain at least one of the adjusted paging parameter or the adjusted paging calculation formula;

determining at least one of an adjusted Paging Frame (PF) or an adjusted Paging Occasion (PO) based on at least one of the adjusted paging parameter or the adjusted paging calculation formula;

sending paging based on at least one of the adjusted PF or the adjusted PO; and sending an indication for an unlicensed paging enhancement mode to a User Equipment (UE), wherein the indication is used for notifying the UE to adjust the paging parameter or the paging calculation formula.

9. The method according to claim 8, wherein the adjusting at least one of a paging parameter or a paging calculation formula comprises:

reducing a paging cycle.

10. The method according to claim 9, wherein the reducing a paging cycle comprises:

notifying a core network side to perform a processing for reducing the paging cycle.

11. The method according to claim 8, wherein the adjusting at least one of a paging parameter or a paging calculation formula comprises:

adjusting a parameter in the paging calculation formula.

12. The method according to claim 11, wherein the adjusting a parameter in the paging calculation formula comprises:

reconfiguring a variable N in the paging calculation formula such that a value of the reconfigured variable N is greater than a value of the non-reconfigured variable N.

13. A User Equipment (UE), comprising: a processor and a memory configured to store a computer programs capable of being executed on the processor, wherein when the computer programs are executed by the processor, the processor is configured to:

adjust at least one of a paging parameter or a paging calculation formula to obtain at least one of the adjusted paging parameter or the adjusted paging calculation formula, and determine at least one of an adjusted Paging Frame (PF) or an adjusted Paging Occasion (PO) based on at least one of the adjusted paging parameter or the adjusted paging calculation formula;

a network interface, configured to receive an indication for an unlicensed paging enhancement mode from a network side, and the processor is further configured to determine to adjust the paging parameter and/or the paging calculation formula based on the indication for the unlicensed paging enhancement mode.

14. The UE according to claim 13, wherein the processor is further configured to reduce a paging cycle.

15. The UE according to claim 13, wherein the processor is further configured to adjust a parameter in the paging calculation formula.

16. The UE according to claim 15, wherein the processor is further configured to reconfigure a variable N in the paging calculation formula such that a value of the reconfigured variable N is greater than a value of the non-reconfigured variable N.

17. The UE according to claim 13, wherein the processor is further configured to perform arithmetic operation on at least one calculation parameter in the paging calculation formula and a numeral value to obtain the adjusted paging calculation formula.

18. The UE according to claim 13, wherein the processor is further configured to increase a PO in a PF.

19. The UE of claim 13, wherein the indication is used for notifying the UE to adjust the paging parameter or the paging calculation formula.

* * * * *